E. G. BUSSE.
BRAKE BEAM HANGER LOCKING KEY.
APPLICATION FILED JUNE 6, 1919.
1,381,275.
Patented June 14, 1921.
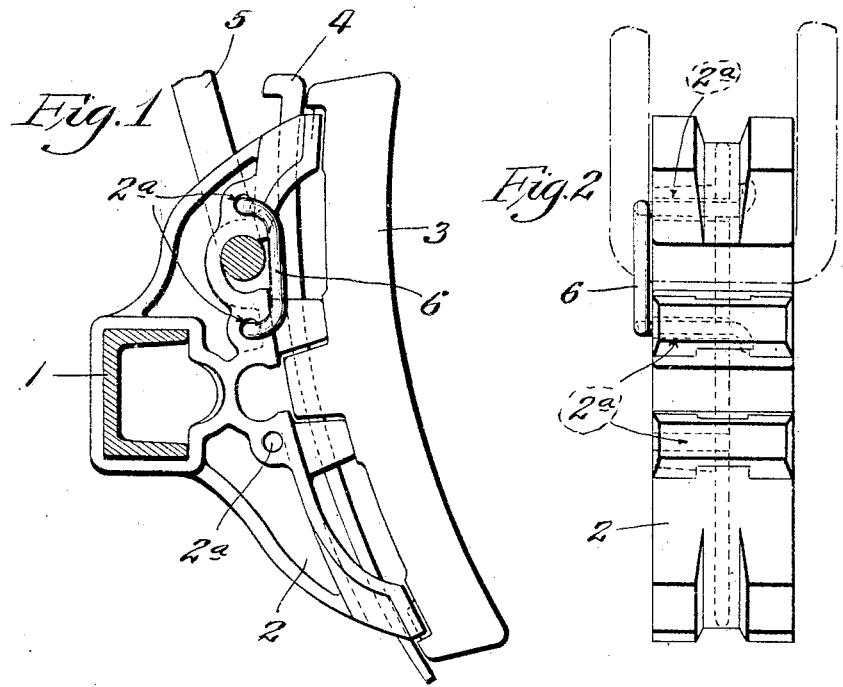
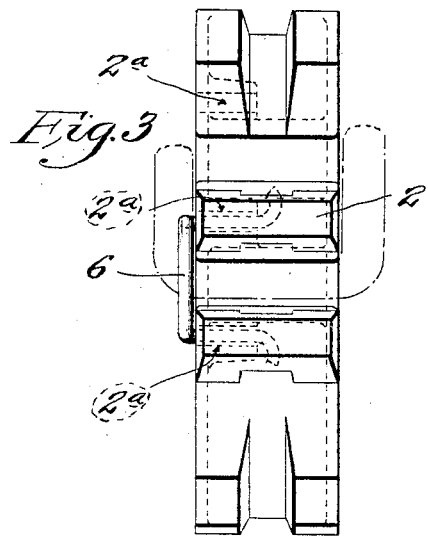
Inventor
Edwin G. Busse

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM-HANGER-LOCKING KEY.

1,381,275. Specification of Letters Patent. Patented June 14, 1921.

Application filed June 6, 1919. Serial No. 302,242.

*To all whom it may concern:*

Be it known that I, EDWIN G. BUSSE, a citizen of the United States, residing at Chicago, Illinois, have invented a certain new and useful Improvement in Brake-Beam-Hanger-Locking Keys, of which the following is a full, clear, and exact description, such as will enable others skilled in the art to which it appertains to make and use the same, reference being had to the accompanying drawings, forming part of this specification, in which—

Figure 1 is a side elevational view of my improved brake head.

Fig. 2 is a front elevational view of a brake head provided with center rib, to which my invention is applied.

Fig. 3 is a front elevational view of a brake head with outside ribs, to which my invention is applied, the same being illustrated as coöperating with the center rib.

This invention relates to a new and useful improvement in locking keys for brake beam hangers, the object being to prevent the brake hanger from contacting with the key which locks the brake shoe to the head, and hence unnecessary wear is avoided.

My improved brake beam head is provided with openings equidistantly spaced and into which are adapted to be inserted the legs of a U-shaped locking key to prevent the accidental displacement of a hanger when engaged in the upper or medial opening of the brake head. The cross bar of this safety lock is offset slightly from the plane of the legs so that its relation to the hanger is to one side, i. e., that side which in effect closes the hanger opening in the brake head. The legs of the locking key may be sprung or bent so that the key is locked in position when inserted to close the front opening of the brake beam hanger and by providing the equidistant openings, the same key may be employed for an upper hanger opening or a medial hanger opening, as desired. Hence, if from severe service, the brake shoe is worn down to such an extent that the usual key is lost, the brake hanger key lock mounted in the brake head will maintain its position and hold the brake hanger to its seat, preventing dropping of the brake beam and possible derailment of the train.

In the drawings, 1 indicates the brake beam member, 2 the brake head, 3 being the brake shoe, 4 the usual key which secures the brake shoe to the brake head and 5 the brake hanger.

In Fig. 1 the brake shoe is shown as having a brake hanger arranged in the upper opening, said brake head having openings 2ª into which the legs of a U-shaped locking key 6 are fitted. The cross bar of this locking key is offset from the plane of the legs so that it will lie in front of the recesses or openings provided in the brake head to receive the brake hanger. These legs may either be bent or sprung before insertion so that they will hold themselves in position, or they may be bent after insertion so that the hanger lock will be permanently secured in position, as shown in Fig. 2.

As shown in Fig. 3, the lock may be used to close the medial opening if the brake hanger is employed at that point.

What I claim is:

1. A brake head provided with two recesses adapted to receive the brake hanger, openings on each side of said recesses adapted to receive a brake hanger lock and a brake hanger lock adapted to fit in said openings to close either of said brake hanger recesses.

2. A U-shaped brake hanger lock whose cross bar is offset from the leg portions and whose leg portions are bent, whereby the lock may be held in position, and a brake head having openings adapted to receive said hanger lock.

3. The combination with a brake head having a recess for a brake hanger, said brake head having openings substantially parallel with said hanger recess, and a U-shaped hanger lock arranged in said opening and bridging the hanger recess.

In testimony whereof I hereunto affix my signature this 27th day of May, 1919.

EDWIN G. BUSSE.

Witnesses:
S. W. CROSBY,
M. F. HUNTOON.